Figure 1:
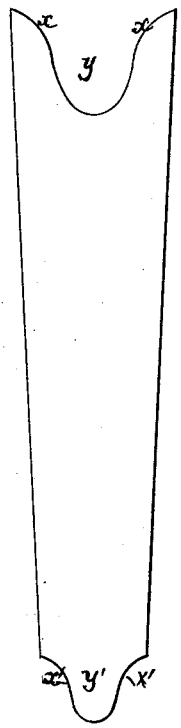
Figure 2:
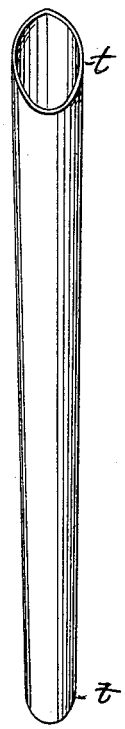
Figure 3:
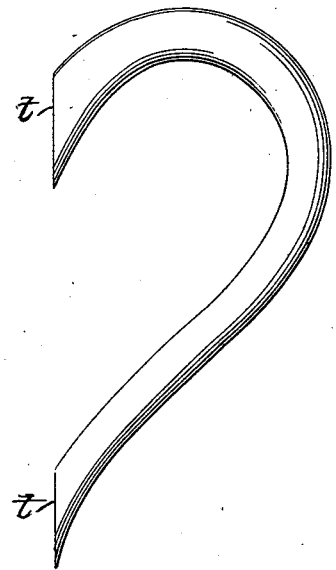

A. BAYLEY.
HANDLES FOR TEA AND COFFEE POTS.

No. 190,807. Patented May 15, 1877.

Witnesses;
Edward Develin
E N Miller

Inventor,
Alfred Bayley

UNITED STATES PATENT OFFICE.

ALFRED BAYLEY, OF NEWARK, NEW JERSEY.

IMPROVEMENT IN HANDLES FOR TEA AND COFFEE POTS.

Specification forming part of Letters Patent No. 190,807, dated May 15, 1877; application filed February 7, 1877.

*To all whom it may concern:*

Be it known that I, ALFRED BAYLEY, of Newark, in the county of Essex and State of New Jersey, have invented a new Process of Manufacturing and Forming from Sheet Metal a Handle for Tea and Coffee Pots and other vessels; and I do hereby declare that the following is a full and exact description of the same.

The nature of my invention consists in forming this same handle as below specified.

Figure I represents the shape of the metal previous to commencement of forming, it then being placed in a machine adapted for the purpose of folding the same into a hollow tube, as represented in Fig. II. It then being filled with melted metal, previous to being formed into shape, it is then placed into a machine to be formed into the desired shape, as represented in Fig. III, the handle being then dipped into a pit of hot metal, thereby causing the core to melt, leaving a perfectly hollow shell, bent as represented in Fig. III.

It will be seen that the upper end of the blank A, Fig. I, is cut away to form a recess, $y$, with two curved edges, $x$ $x$, and that the lower end has a rounded projection, $y'$, with two inwardly-curved edges, $x'$ $x'$, and that when the blank is bent to a tubular form, as shown in Fig. II, the end edges, in consequence of the above-described peculiar form of the blank, coincide with a plane, and, further, that when the tube is bent to the form shown in Fig. III, the said edges $t$ $t$ are parallel or thereabout to each other, so that the cutting and trimming of the ends of the handle, heretofore indispensable, are rendered unnecessary.

I claim—

The within-described improvement in making sheet-metal handles, the same consisting in first cutting a blank with a recess, $y$, and curved edges $x$ $x$ at one end, and with a projection, $y'$, and curved edges $x'$ $x'$ at the other, and then forming said blank into a tube and bending until the ends are on the same plane, as set forth.

ALFRED BAYLEY.

Witnesses:
EDWARD DEVELIN,
E. N. MILLER.